Dec. 27, 1960
R. A. LOUIS
2,966,531
INCREASING EFFICIENCY OF HYDROCARBON
SEPARATION WITH ADSORBENTS
Filed April 1, 1958
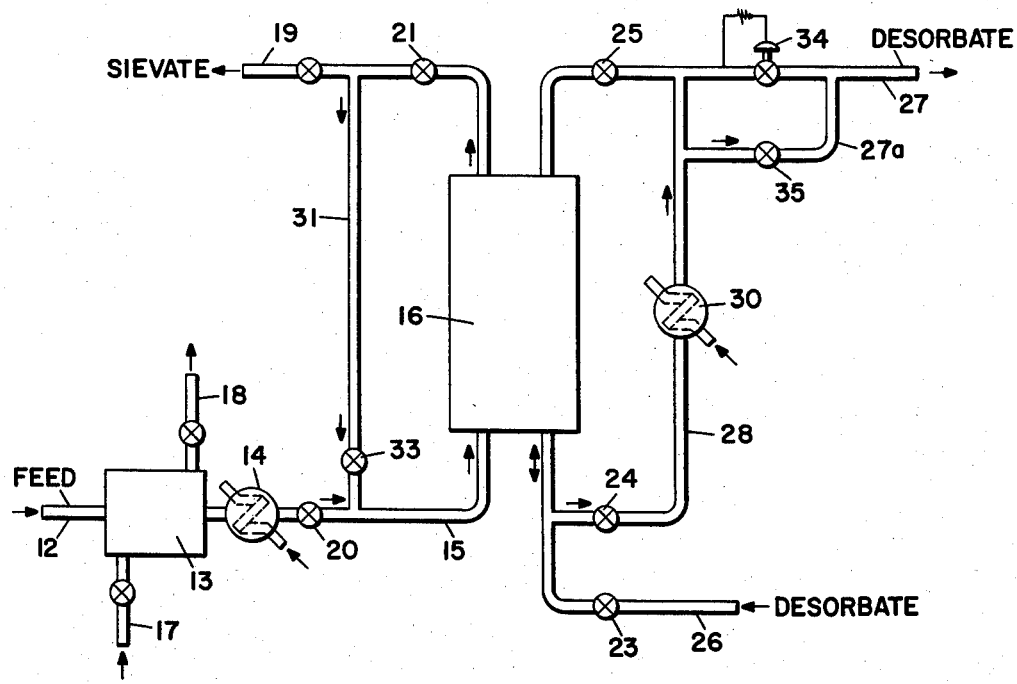
Robert A. Louis   Inventor
By *Byron O. Dimmick*
Attorney

United States Patent Office 2,966,531
Patented Dec. 27, 1960

2,966,531

INCREASING EFFICIENCY OF HYDROCARBON SEPARATION WITH ADSORBENTS

Robert A. Louis, Fanwood, N.J., assignor to Esso Research and Engineering Company, a corporation of Delaware Filed Apr. 1, 1958, Ser. No. 725,554

4 Claims. (Cl. 260—676)

This invention concerns improvements in the art of selectively separating hydrocarbons of different types when employing solid adsorbents having a greater affinity for one type of hydrocarbon than for another. One class of such adsorbents are known as molecular sieves. This invention is particularly directed to a process for separating normal paraffin hydrocarbons from mixtures with hydrocarbons of other types wherein contamination of the recovered adsorbate is reduced to a minimum.

It is well known that certain solid adsorbents can be employed for separating mixtures of organic materials into components having different characteristics. Thus, for example, certain natural zeolites, such as chabazite or analcite, have the property of preferentially adsorbing hydrocarbons of one type from mixtures of the same with hydrocarbons of other types. Certain synthetic zeolites also have this property. These natural and synthetic zeolites are characterized by the fact that their crystal patterns present structures having a large number of pores of exceptionally uniform size. Because of these properties of uniform small pore size and of selective affinity for certain molecules in preference to others, these zeolites are known as molecular sieves. The pores in different molecular sieve zeolites may vary in diameter from less than 4 up to 15 or more Angstroms but for any one molecular sieve zeolite the pores are of substantially uniform size.

The various zeolites differ somewhat from each other in chemical composition but, in general, they may be characterized as alkali metal or alkaline earth metal alumino-silicates. Among the synthetic zeolites that have been disclosed as having molecular sieve properties is one with the empirical formula $(CaNa_2)Al_2Si_4O_{12} \cdot 2H_2O$ (cf., Barrer, U.S. Patent 2,306,610) and one having the empirical formula $4CaO \cdot Al_2O_3 \cdot 4SiO_2$ (see the Black patents, U.S. 2,442,191 and 2,522,426). An extended discussion of molecular sieves is presented in articles by Breck and others, appearing in "Journal of the American Chemical Society," vol. 78, pages 5963 et seq. (December 1956).

A molecular sieve of 5 Angstrom pore size can be used for separating normal paraffin hydrocarbons from mixtures of the same with isomeric branched chain hydrocarbons and other hydrocarbons, such as aromatics, for example. The straight chain hydrocarbons will be adsorbed by the molecular sieve while the other hydrocarbons will not. The adsorbed hydrocarbons can then be recovered by desorption from the molecular sieve. Such a separation process is of interest in the petroleum industry since it enables the removal of normal paraffin hydrocarbons from light naphthas with a resultant upgrading in the octane rating of the naphtha. The normal paraffins thus removed may be subjected to reforming or isomerization processes to convert them to other hydrocarbons of higher octane rating for blending into gasoline.

In a commercial process for separating normal paraffin hydrocarbons from a naphtha a cyclic operation is employed, that is, one involving an adsorption step followed by a desorption step and then a second adsorption step and so on.

One cyclic process that may be employed and that is particularly desirable involves desorption at a temperature considerably higher than that used in the adsorption step accompanied by reduction in the total pressure on the system so as to reduce the partial pressure of the adsorbed material in the vapor surrounding the molecular sieve. It is possible to operate with only as much as 100° F. difference between adsorption and desorption temperatures but it is preferred that there be a somewhat greater difference. Thus adsorption may be effected at 200 to 400° F. and desorption at 500 to 1000° F.

Preferably, in practicing the present invention, for the removal of normal paraffin hydrocarbons from a light naphtha, adsorption is conducted at a relatively low temperature, as for example 200 to 400° F., and at pressures of about 15 to 30 p.s.i.g.; and desorption is conducted at a considerably higher temperature, as for example 500 to 700° F., and at a reduced pressure of the order of 150 mm. In a process of this type where it is desired to recover the normal paraffin hydrocarbons as a relatively uncontaminated product, it is convenient to effect the heating of the molecular sieve prior to desorption by recycling through the adsorption zone a heated portion of the desorbed normal paraffins obtained from a previous desorption cycle.

Although excellent separation of normal paraffin hydrocarbons from a mixture containing them along with other hydrocarbons, as for example from a light naphtha, can be realized by such a procedure, and although the "sievate," i.e. the effluent from the molecular sieve bed, is of high quality in that it will contain less than 2 percent of normal paraffins, the normal paraffin desorbate that is collected during the desorption step of the cycle tends to be impure in that it contains only about 75% to 80% of normal paraffins instead of a desired 95 to 100% of normal paraffins. It is believed that the contamination of the desorbate with non-normal hydrocarbons is the result of surface adsorption occurring either during the cooling portion of the cycle or during the portion of the cyle when the naphtha feed is passing through the sieve bed.

It is an object of the present invention to increase the quality of the desorbate when employing a thermal cyclic process for the separation of normal paraffins from other hydrocarbons.

In accordance with the present invention, a thermal cyclic adsorption-desorption process using molecular sieves is materially improved and the cycle capacity is maintained at a high level by cutting off the feed to the bed of molecular sieve during the adsorption phase of the cycle, at a time prior to the normal appearance of straight chain paraffin hydrocarbons in the effluent from the sieve bed, and injecting, in the same direction as the feed, a quantity of sieve desorbate from a previous cycle or from a parallel bed, during the remaining portion of the adsorption phase of the cycle. This desorbate purge is preferably at about the same temperature as the feed temperature. By cutting off the feed before breakthrough of normal paraffins occurs, a portion of the sieve bed remains "unsaturated" with respect to normal hydrocarbons at the exit end of the bed of sieve. During the introduction of the desorbate purge, in the continuation of the adsorption phase of the cycle, the hydrocarbons that are loosely held on the body of the molecular sieve are displaced. The "unsaturated portion" of the sieve bed serves to "clean up" this displaced material by adsorbing the normal paraffin hydrocarbons from it, the non-absorbed material passing on out of the sieve bed as additional sievate product. Then, during the subsequent desorption step at the higher temperature and lower pressure used in that step, essentially only normal paraffin hydrocarbons will be collected from the sieve.

The nature and objects of the invention will be more readily understood when reference is made to the accompanying drawing showing a schematic flow plan of an operation suitable for carrying out the invention.

The process may be illustrated by describing the treatment of a light virgin naphtha having a boiling range of about 75° to 250° F. and a research octane rating of about 70 unleaded. A typical naphtha of this boiling range may contain 20 to 35 percent of normal paraffin hydrocarbons, principally normal hexane and normal pentane, with minor amounts of normal heptane and normal butane, the remaining material consisting principally of branched chain paraffins and cyclic hydrocarbons. Essentially only normal paraffins will be adsorbed from such a naphtha in the pores or cavities of a molecular sieve of 5 A. size.

Referring now to the drawing, the vaporized feed that is to be treated is heated to a temperature in the range of 200° to 300° F., for example, and conducted into adsorption zone 16 containing a bed of molecular sieve of 5 A. pore size. Preferably the feed is in the vapor phase and is heated to a temperature above the dew point of the feed. It may be desirable to pass the feed through a purifying zone to remove moisture before the feed enters the adsorption tower 16, since the capacity of molecular sieves to adsorb hydrocarbons may be greatly reduced if water is present even in small quantities. Therefore, in the preferred mode of operation of the invention, the feed is first passed by means of line 12 into a preliminary purification zone 13 containing a suitable drying agent. Zone 13 may contain, for example, molecular sieves of 4 A. pore size. It is also possible to employ 5 A. molecular sieves in this zone. Alternatively, zone 13 may contain silica gel for example. It is important that water be removed from the feed before it enters the main adsorption tower because the presence of water greatly impairs the adsorption efficiency of the molecular sieve. The purification zone treatment not only removes water but trace impurities as well. Although one drying or purification zone 13 is shown in the drawing, it will be obvious that at least two of such zones will be necessary, the feed being switched from one zone to another when it is desired to regenerate the drying zone. Such regeneration may be accomplished by sweeping out the water with heated gases such as nitrogen or other oxygen-free gas, the latter entering the zone through line 17 and leaving through line 18. It is, of course, to be understood that a clean dry feed may not require this purification treatment.

As previously stated the hydrocarbon feed is contacted with the molecular sieve adsorbent in tower 16, preferably in the vapor phase, at temperatures above the dew point of the feed. To vaporize the feed and to attain adsorption temperature the feed passes through heat exchanger 14 before entering tower 16 by means of line 15. The molecular sieve adsorbent in the tower may be arranged in trays or packed on supports, or may be present in an unsupported condition. Typically the 5 A. sieve material may comprise pellets about $\frac{1}{16}$ to $\frac{1}{8}$ inch in diameter and $\frac{3}{16}$ inch long and having a pore volume of about 0.25 cc. per gram. Suitable adsorption conditions within zone 16 include flow rates of 0.2 to 2 w./w./hr., pressures of 0 to 50 p.s.i.g. and temperatures ranging from just above the dew point of the feed up to about 400° F. Flow of feed within tower or zone 16 may be either upflow or downflow.

The normal paraffin hydrocarbons contained in the feed will be adsorbed in the pores of the molecular sieve adsorbent and the effluent leaving the zone through line 19 will be essentially free of normal paraffin hydrocarbons. Thus the effluent will have higher concentrations of branched and cyclic hydrocarbons and will have a higher octane rating than the original feed. The effluent leaving through line 19 may be conducted to a suitable storage vessel for subsequent use as a component for a high octane motor fuel.

Ordinarily, the adsorption step of the cycle is continued until normal paraffin hydrocarbons begin appearing in the effluent as determined by conventional means such as refractive index or gravity measurements or spectrographic analysis of the effluent. However, in accordance with the present invention, the feed is cut off from the sieve at a time prior to that usually required for the appearance of normal paraffins in the effluent. The time for breakthrough is determined by a previous test on the sieve bed. After the feed is cut off by closing valve 20, valve 23 is opened and a stream of desorbate, i.e. normal paraffins, obtained from a previous desorption step or from a parallel sieve bed, is sent via line 26 into the adsorption zone to displace loosely held material from the sieve bed. The temperature of this desorbate stream is preferably about the same as that of the feed stream. As previously stated, the normal paraffin hydrocarbons in this loosely held material are adsorbed in the terminal portion of the bed and the remaining unadsorbed material leaves the bed as sievate through line 19. When normal hydrocarbons begin to appear in line 19, valves 21 and 23 are closed and valves 24 and 25 are opened. A recycle stream of desorbate passes through line 28 to heat exchanger 30 where it is heated to a temperature of 600 to 700° F., for example, to heat the bed of molecular sieve to the desired desorption temperature. Preferably, the heated stream passes downflow through the sieve bed, as shown. As desorption progresses, desorbate is bled off through valve 34 to maintain constant pressure in zone 16. After the bed has attained the desired temperature, valve 25 is closed, valve 35 is opened and the pressure in the adsorption zone is reduced by applying a vacuum via lines 27 and 27a to complete the desorption. The pressure may be reduced to about 100 to 150 mm. for example.

Following the desorption, the bed of sieve is cooled to the temperature necessary for the next adsorption step of the cycle. This can conveniently be done by closing valves 24 and 35, opening valves 21 and 33 and recycling a portion of the "sievate" upflow via lines 31 and 15. This stream of "sievate" is most conveniently obtained from the effluent from another tower identical with tower 16 which is at that time on an adsorption portion of the cycle. To simplify the drawing the additional towers 16 and the necessary additional lines and valves are omitted, since the drawing as given adequately illustrates the principles and flow patterns involved. When the bed of sieve has been cooled to the desired temperature, valve 33 may be closed and valve 20 opened and the next adsorption step begun by passing in feed through line 15.

Since some pressure differential is necessary to force the desorbate and sievate streams through the bed rapidly enough to heat or cool the bed of sieve with reasonable speed, these streams may enter tower 16 at pressures somewhat higher than is used in the adsorption step itself.

The benefits arising from this invention are illustrated in the following example.

*Example*

Separation of normal paraffin hydrocarbons from a $C_5/C_6$ light virgin naphtha (containing normal $C_5$ and $C_6$ paraffins) was accomplished by means of commercially available synthetic zeolite 5 A. molecular sieve pellets ($\frac{1}{16}$" diameter x $\frac{3}{16}$" long) in a cyclic operation.

In the cycle tested, adsorption was at 365° F. and 15 p.s.i.g. and the feed rate was 0.7 w./w./hr. Desorption was accomplished by heating the sieve bed to an average temperature of 600° F. with recycled desorbate vapors at 650° F. followed by reducing pressure in the sieve case to 150 mm. Hg absolute pressure.

Runs were made in which the feed was continued until break-through of normal paraffins occurred and other runs were made in which the feed was cut off before break-through and additional desorbate purge used. The results of these runs, which in each instance are averages of a number of consecutive adsorption-desorption cycles, are shown in the accompanying table. The purpose of the desorbate purge in the runs continued to break-through was to sweep feed vapors from the adsorption zone prior to desorption. The greater amount of desorbate purge in the case of the runs where feed was cut off prior to break-through represents that vapor sweeping purge plus the purge used for displacing loosely held material that is subsequently contacted by the terminal portion of the molecular sieve bed, in accordance with the present invention. The desorbate purge in all cases was at about feed temperature. These data show that the quality of the desorbate was greatly improved by operating the process in accordance with the present invention.

|  | Feed to Break-Through | Feed Cut Off Before Break-Through |
| --- | --- | --- |
| Adsorption Condition: |  |  |
| Time, min | 13 | 11.5 |
| Feed Rate, w./w./hr | 0.67 | 0.71 |
| Total Feed, g./100 g | 14.5 | 13.4 |
| Desorbate Purge Condition: |  |  |
| Time, min | 3 | 5 |
| Purge Rate, w./w./hr | 0.03 | 0.12 |
| Total Purge, g./100 g | 0.16 | 1.4 |
| Product Quality: |  |  |
| Sievate, Percent Non-normals | 98.5 | 98.5 |
| Desorbate, Percent Normals | 86.3 | 95.5 |
| Sieve Capacity: |  |  |
| Gms./100 Gms./cycle | 4.0 | 4.1 |

In the preferred mode of operation of the invention the point of feed cut-off is determined by the amount of material that tends to be loosely held by the bed of molecular sieve. The amount of material that is loosely held will vary with the nature of the feed material, the nature of the molecular sieve used and the temperature and pressure conditions used, but the quantity can readily be determined by persons skilled in this art. Since the purge action when using the desorbate to displace the loosely held material is essentially a volume-for-volume displacement, the amount of desorbate purge will be about the same as the amount by which the feed has been cut back. Thus, in the example, it was determined that of the 14.5 grams of feed used per 100 grams of molecular sieve, slightly more than 7 percent, or about 1.1 g., was loosely held material. Therefore to practice the present invention the feed was cut off by 1.1 g. per 100 grams of molecular sieve and the desorbate purge at feed temperature was increased by approximately the same amount. There is little to be gained in using appreciably more additional desorbate purge than the amount by which the feed is cut back.

There are at least three distinct advantages that result from the operation of the cyclic process in accordance with this invention. One of these is that the desorbate quality is greatly improved. A second advantage is that there is no need to recycle an effluent stream to remove undesired components from that stream. A third advantage is that the capacity of the molecular sieve is fully utilized and there is no loss in cycle capacity resulting from the practice of the invention.

It is, of course, to be understood that the scope of this invention is not to be limited to the specific examples given herein, nor by any theory regarding its operation. Although the invention has been particularly exemplified with molecular sieves of 5 A. pore size the same principles are applicable to other molecular sieve adsorbents as well. The scope of the invention is to be determined only by the appended claims.

What is claimed is:

1. In a process for the separation of hydrocarbons of a selected type from a mixture thereof with hydrocarbons of other types wherein said mixture is contacted with a body of a zeolitic molecular sieve adsorbent of a selected pore size at a selected pressure and temperature, and an effluent stream essentially free of said selected type hydrocarbons is collected, during an adsorption step, and adsorbed hydrocarbons are subsequently desorbed from said adsorbent, in a desorption step, by recycling a heated stream of desorbate through said adsorption zone, the improvement which comprises discontinuing the feeding of said mixture to said body of adsorbent during the latter portion of the adsorption step, at a time prior to the normal time for appearance in the effluent of the type of hydrocarbon being adsorbed, thereafter injecting into said body of adsorbent during the latter portion of said adsorption step a quantity of recycled desorbate at about the same adsorption temperature while continuing to collect an effluent stream essentially free of said selected type hydrocarbon, and thereafter desorbing said body of adsorbent in the manner aforesaid.

2. Process as defined by claim 1 wherein normal paraffinic hydrocarbons are separated from mixtures with other hydrocarbons using a molecular sieve adsorbent of 5 A. pore size.

3. Process as defined by claim 1 in which the amount of recycled desorbate employed in the said latter portion of the adsorption step is approximately equal to the amount by which the feed stream of the said hydrocarbon mixture has been cut back short of the amount normally required for the type of hydrocarbon being adsorbed to appear in the effluent.

4. Process as defined by claim 1 in which the amount by which the feed stream is cut back short of the point of normal appearance in the effluent of the type of hydrocarbon being adsorbed is approximately equal to the quantity of feed material that is found by experience to be lossely held by said body of molecular sieve when the feeding of said stream is continued to said point of normal appearance of said hydrocarbons of the type being adsorbed.

References Cited in the file of this patent
UNITED STATES PATENTS

| 2,519,343 | Berg | Aug. 22, 1950 |
| 2,818,137 | Richmond | Dec. 31, 1957 |
| 2,818,449 | Christiansen et al. | Dec. 31, 1957 |
| 2,859,256 | Hess et al. | Nov. 4, 1958 |